(12) United States Patent  
Abreo

(10) Patent No.: US 11,558,583 B2  
(45) Date of Patent: Jan. 17, 2023

(54) TRAIN WHEEL DETECTION AND THERMAL IMAGING SYSTEM

(71) Applicant: PROGRESS RAIL LOCOMOTIVE INC., Lagrange, IL (US)

(72) Inventor: Gabriel G. Abreo, Grain Valley, MO (US)

(73) Assignee: Progress Rail Services Corporation, Albertville, AL (US)

( * ) Notice: Subject to any disclaimer, the term of this patent is extended or adjusted under 35 U.S.C. 154(b) by 726 days.

(21) Appl. No.: 16/549,259

(22) Filed: Aug. 23, 2019

(65) Prior Publication Data

US 2021/0058588 A1   Feb. 25, 2021

(51) Int. Cl.

| G01S 13/32 | (2006.01) |
| H04N 7/18 | (2006.01) |
| H04N 5/232 | (2006.01) |
| G01M 17/10 | (2006.01) |
| G01J 5/00 | (2022.01) |
| B61L 23/00 | (2006.01) |

(52) U.S. Cl.
CPC .............. *H04N 7/183* (2013.01); *B61L 23/00* (2013.01); *G01J 5/0022* (2013.01); *G01M 17/10* (2013.01); *G01S 13/32* (2013.01); *H04N 5/23203* (2013.01); *G01J 2005/0033* (2013.01); *G01J 2005/0077* (2013.01)

(58) Field of Classification Search
CPC .... H04N 7/183; H04N 5/23203; B61L 23/00; G01J 5/0022; G01M 17/10; G01S 13/32
USPC ....................................................... 701/33.9
See application file for complete search history.

(56) References Cited

U.S. PATENT DOCUMENTS

| 5,764,162 | A | 6/1998 | Ehrlich |
| 8,112,237 | B2 | 2/2012 | Bartonek |
| 8,478,480 | B2 | 7/2013 | Mian et al. |
| 8,854,052 | B2 | 10/2014 | Sheikman et al. |
| 2003/0006901 | A1* | 1/2003 | Kim ................... G06K 19/0723 340/572.1 |
| 2018/0120132 | A1* | 5/2018 | Tanutama .............. G01D 18/00 |

(Continued)

FOREIGN PATENT DOCUMENTS

| FR | 2691262 A1 | 11/1993 |
| RU | 2075416 C1 | 3/1997 |

(Continued)

*Primary Examiner* — Nguyen T Truong
(74) *Attorney, Agent, or Firm* — Harrity & Harrity, LLP

(57) ABSTRACT

A system that includes a detection device, an imaging device, and a control device is disclosed. The detection device may generate proximity data relating to a proximity of an undercarriage of a rail vehicle, and the imaging device may capture one or more thermal images of the undercarriage. The control device may receive a first thermal image and a second thermal image of the undercarriage. The first thermal image may be captured using a first integration time, and the second thermal image may be captured using a second integration time. The control device may determine composite thermal data associated with the undercarriage. The composite thermal data may include information mapping a first range of thermal data and mapping a second range of thermal data to one or more components of the undercarriage. The control device may cause an action to be performed in connection with the composite thermal data.

20 Claims, 4 Drawing Sheets

(56) References Cited

U.S. PATENT DOCUMENTS

2018/0210076 A1* 7/2018 Takada ................... G01S 7/354
2020/0141807 A1* 5/2020 Poirier ................... G01J 5/025

FOREIGN PATENT DOCUMENTS

RU           2379209 C1    1/2010
WO    WO-2012073016 A1 *  6/2012  ............. A61B 3/113

* cited by examiner

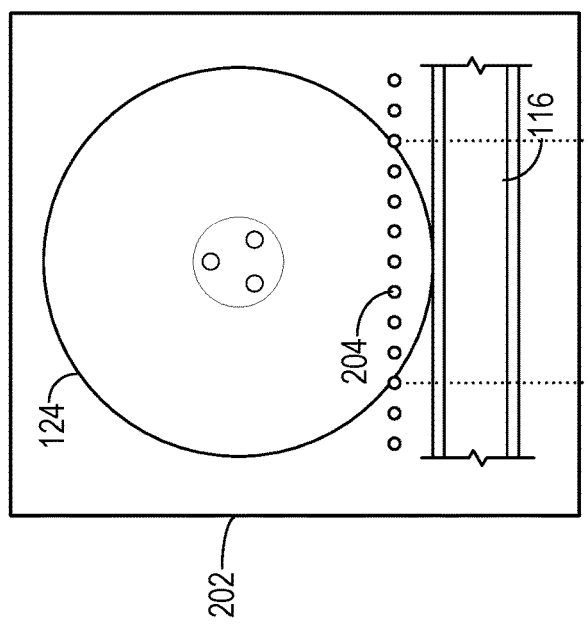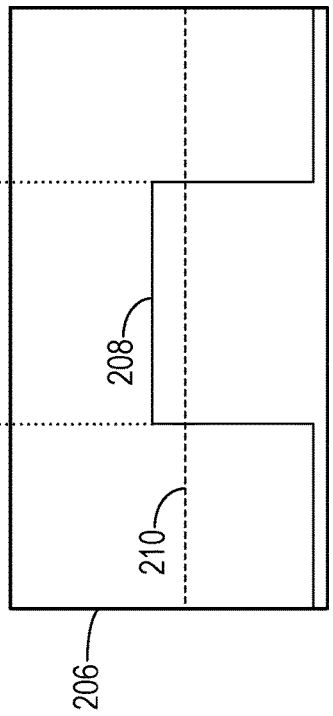

TRAIN WHEEL DETECTION AND THERMAL IMAGING SYSTEM

TECHNICAL FIELD

The present disclosure relates generally to railroad monitoring systems and, for example, to a wheel detection and thermal imaging system.

BACKGROUND

A railroad may be provided with a monitoring system to ensure safe and efficient operation of rail vehicles on the railroad. A monitoring system may include an arrangement of sensors that are installed on and/or attached to a rail bed, a rail, a rail tie, and/or another structure of the railroad and configured to assess a condition of an undercarriage component (e.g., a wheel, a bearing, an axle, a braking mechanism, and/or the like) of a passing rail vehicle. In some cases, worn or damaged undercarriage components can cause an increase in friction, cause more power to be consumed to propel the rail vehicle, and/or reduce overall efficiency of the rail vehicle. More significant wear or damage can cause undercarriage components to seize, cause damage to surrounding components and/or the railroad, and/or pose a potential safety hazard. A monitoring system may be used to identify signs of such wear or damage to an undercarriage component of the rail vehicle. Information from the monitoring system can be used to warn railroad operators and/or rail vehicle operators of potential safety hazards and/or to identify an undercarriage component in need of service or repair.

In some cases, a monitoring system may monitor temperatures of undercarriage components to determine a condition of the undercarriage components. For example, the monitoring system may use a combination of a proximity sensor and a set of infrared cameras designed to measure wheel and/or bearing temperatures of a passing rail vehicle. The proximity sensor is typically installed directly on the railroad and arranged to detect when a rail vehicle passes over and/or by the proximity sensor. The infrared cameras are also installed directly on the railroad and arranged to capture thermal images of wheels and bearings of the rail vehicle at appropriate times indicated via the proximity sensor. Accordingly, a significant number of sensors, detectors, controllers, cables, and/or other hardware may need to be installed directly on a railroad in order to implement a monitoring system. While it is generally desirable to minimize the number of such on-track hardware on the railroad, current monitoring systems may be less effective if installed elsewhere or with fewer on-track hardware components.

In particular, a proximity sensor (e.g., an inductance sensor and/or the like) of a monitoring system may rely on an electromagnetic interaction between the proximity sensor and a rail vehicle, which typically occurs when the rail vehicle is in relatively close range with the proximity sensor. In order to ensure sufficient electromagnetic interactions between the proximity sensor and the rail vehicle, and in order to effectively detect proximity of the rail vehicle, the proximity sensor may need be installed directly on the railroad. Similarly, to effectively detect thermal radiation from an undercarriage component (e.g., a wheel, a bearing, an axle, and/or the like) of the rail vehicle, a thermal camera may need to be positioned underneath the rail vehicle and directly on the railroad. Furthermore, due to a limited temperature range that a single thermal camera is capable of detecting in a single instance or scene, multiple on-track thermal cameras may be needed to adequately measure the different ranges of temperatures at which the different undercarriage components of the rail vehicle typically operate.

One attempt to provide a solution for evaluating a vehicle is disclosed in U.S. Pat. No. 8,478,480, issued to Mian, et al. filed on Jul. 2, 2013 ("the '480 patent"). In particular, the '480 patent discloses a computer system that includes infrared devices, an evaluation device, an identification device, and sensing devices. The '480 patent discloses that the evaluation subsystem can communicate with an acquisition subsystem, a sensing subsystem, and/or an identification subsystem. The '480 patent further discloses that the acquisition subsystem can fuse multiple captured frames having different characteristics (e.g., longer exposure, different filters, and/or the like) into a higher-bit resolution digital image that maintains the temperature information in each separate frame. However, the '480 patent does not disclose a solution for minimizing a number of monitoring hardware components installed on a railroad. For instance, the '480 patent does not disclose an off-track solution for detecting a rail vehicle, or an imaging solution that captures multiple temperature ranges associated with different undercarriage components of a rail vehicle using a single imaging device.

A wheel detection and thermal imaging system of the present disclosure solves one or more of the problems set forth above and/or other problems in the art.

SUMMARY

According to some implementations, a method may include receiving, by a device, proximity data relating to an undercarriage of a rail vehicle; transmitting, by the device and based on the proximity data, a command signal to an imaging device, the command signal being configured to cause the imaging device to capture a first thermal image and a second thermal image of the undercarriage, the first thermal image being captured using a first integration time, and the second thermal image being captured using a second integration time that is different from the first integration time; receiving, by the device, image data relating to the first thermal image and the second thermal image, the image data including information relating to a first range of thermal data and a second range of thermal data associated with the undercarriage; determining, by the device and based on the image data, composite thermal data associated with the undercarriage, the composite thermal data including information mapping the first range of thermal data to a first component of the undercarriage and mapping the second range of thermal data to a second component of the undercarriage; and causing, by the device, an action to be performed in connection with the composite thermal data.

According to some implementations, a device may include one or more memories; and one or more processors, communicatively coupled to the one or more memories. The one or more processors may be configured to transmit a narrowband radio frequency signal that is directed at a pathway of an undercarriage of a rail vehicle; receive a reflected portion of the narrowband radio frequency signal; compare a magnitude of the reflected portion of the narrowband radio frequency signal with a signal threshold; generate proximity data relating to the undercarriage based on determining that the magnitude of the reflected portion of the narrowband radio frequency signal satisfies the signal threshold; and cause an action to be performed based on the proximity data.

According to some implementations, a system may include a detection device, an imaging device, and a control device. The detection device may be configured to generate proximity data relating to a proximity of an undercarriage of a rail vehicle. The imaging device may be configured to capture one or more thermal images of the undercarriage. The control device may be in communication with the detection device and the imaging device. The control device may be configured to capture, based on the proximity data, a first thermal image and a second thermal image of the undercarriage, the first thermal image being captured using a first integration time, and the second thermal image being captured using a second integration time that is different from the first integration time; determine, based on the first thermal image and the second thermal image, composite thermal data associated with the undercarriage, the composite thermal data including information mapping the first range of thermal data to a first component of the undercarriage and mapping the second range of thermal data to a second component of the undercarriage; and cause an action to be performed in connection with the composite thermal data.

BRIEF DESCRIPTION OF THE DRAWINGS

FIGS. 2A and 2B are diagrams of an example implementation of a wheel detection and thermal imaging system described herein.

DETAILED DESCRIPTION

Figure 1:
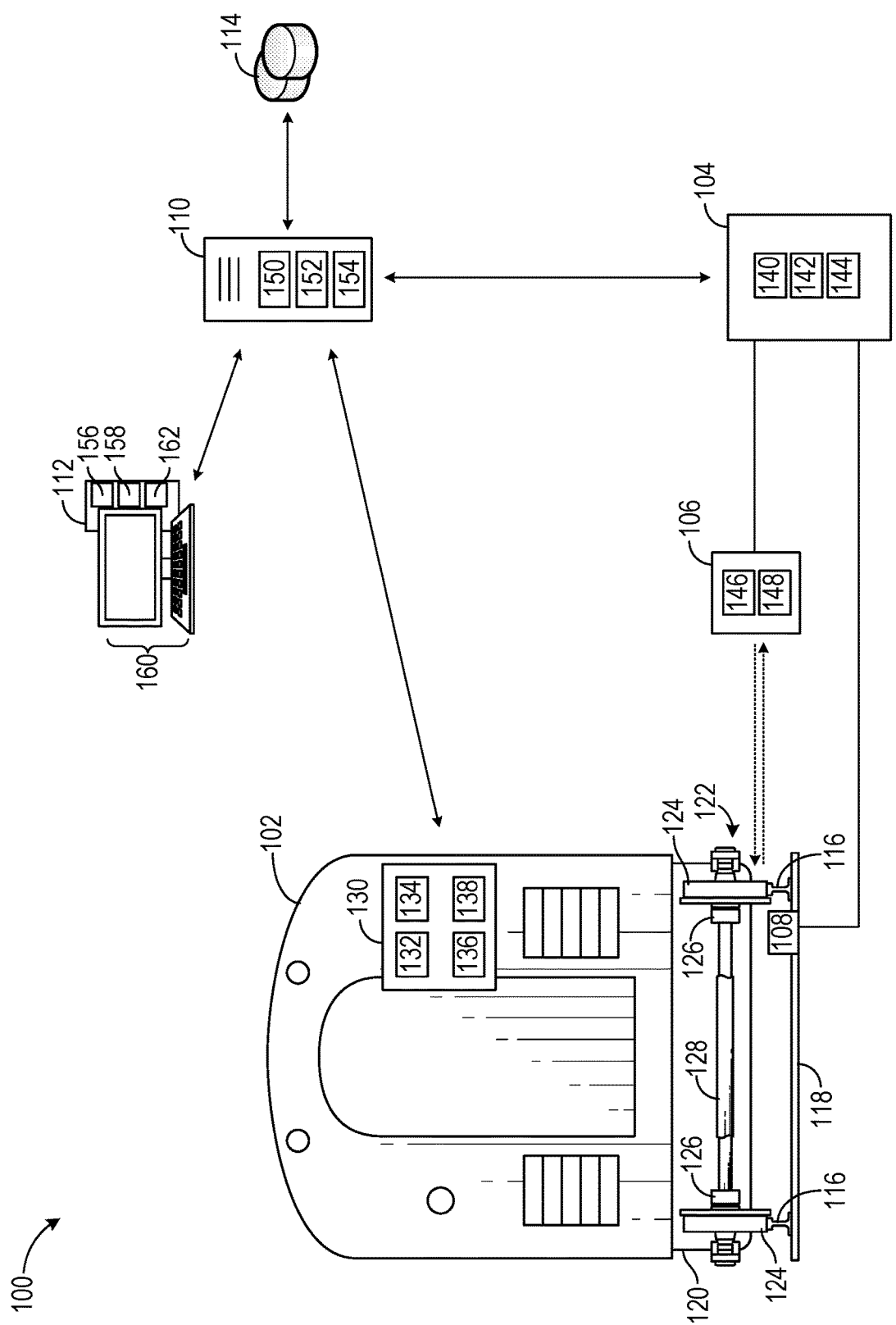
FIG. 1 is a diagram of an example wheel detection and thermal imaging system described herein.

FIG. 1 is a diagram of an example wheel detection and thermal imaging system 100 described herein. As shown in FIG. 1, wheel detection and thermal imaging system 100 may include a rail vehicle 102, a control device 104, a detection device 106, an imaging device 108, a monitoring platform 110, a control station 112, a network storage device 114, and/or another device configured to aid wheel detection and thermal imaging system 100 in monitoring rail vehicle 102. Rail vehicle 102 may include a train, a locomotive, a railcar, a consist of one or more locomotives, and/or another vehicle configured to travel on a railroad. Rail vehicle 102 may be configured to travel along a set of rails 116 provided on a rail bed 118. Wheel detection and thermal imaging system 100 may be used to detect a proximity of rail vehicle 102 relative to detection device 106, capture thermal images associated with rail vehicle 102, determine composite thermal data associated with rail vehicle 102, and/or provide other information for monitoring an operating condition of rail vehicle 102.

In some implementations, wheel detection and thermal imaging system 100 may include multiple rail vehicles 102, multiple control devices 104, multiple detection devices 106, multiple imaging devices 108, and/or multiple control stations 112 that interact with monitoring platform 110 and/or network storage device 114. In some examples, wheel detection and thermal imaging system 100 may include multiple monitoring platforms 110 and/or multiple network storage devices 114 that interact with rail vehicle 102, control device 104, detection device 106, imaging device 108, and/or control station 112. In some examples, wheel detection and thermal imaging system 100 may be used with an autonomous or a semi-autonomous rail vehicle 102. For example, wheel detection and thermal imaging system 100 may be used to guide, navigate, and/or control an autonomous or a semi-autonomous rail vehicle 102 based on location data associated with rail vehicle 102, coordinate data associated with a railroad, coordinate data associated with a target destination, and/or the like. In some examples, rail vehicle 102 may receive guidance, navigation, and/or control information from a remote operator via control station 112, an operator within rail vehicle 102, and/or from another device.

As further shown in FIG. 1, rail vehicle 102 includes a frame 120, an undercarriage 122, wheels 124, bearings 126, axles 128, and a control unit 130. Undercarriage 122 may be mounted to frame 120 and support bearings 126. Bearings 126 may be configured to support wheels 124 and axles 128 connected to undercarriage 122. Wheels 124 and axles 128 may be sized, positioned, and configured to support rail vehicle 102 on rails 116 of rail bed 118. Rail vehicle 102 may include multiple sets of wheels 124, bearings 126, and/or axles 128. In some examples, such as when the rail vehicle is a locomotive, wheels 124 and/or axles 128 may be operated via a combustion engine, a traction motor, an electric power source, a hybrid power source, a braking device, a regenerative braking device, and/or the like that is controlled via control unit 130 of rail vehicle 102, control station 112, monitoring platform 110, and/or another device. In some examples, such as when rail vehicle 102 is a trailing railcar that is driven by another rail vehicle 102 (e.g., a lead locomotive), movement of wheels 124 and axles 128 may be controlled via a braking device and otherwise configured to freewheel.

Control unit 130 includes a processor 132, a memory 134, a user interface 136, and a communication device 138. Processor 132 is implemented in hardware, firmware, and/or a combination of hardware and software capable of being programmed to perform a function associated with rail vehicle 102 and/or wheel detection and thermal imaging system 100. Memory 134 includes a random-access memory (RAM), a read only memory (ROM), and/or another type of dynamic or static storage device that stores information and/or instructions to be performed by processor 132. User interface 136 includes an input device enabling an operator of rail vehicle 102 to specify an operating parameter of rail vehicle 102 (e.g., a propulsion request, a braking request, a power demand, a target travel speed, and/or the like), and an output device enabling the operator to access an operating condition of rail vehicle 102 (e.g., an operating temperature or other health data, a power output, an actual travel speed, and/or the like). In some examples, such as when rail vehicle 102 is a trailing railcar, user interface 136 and/or control unit 130 may be located in another rail vehicle 102 (e.g., a lead locomotive).

Communication device 138 includes a local area network (LAN) component (e.g., an Ethernet and/or another communication bus component), a wireless local area network (WLAN) component (e.g., a Wi-Fi component), a radio frequency (RF) communication component (e.g., a Bluetooth component), and/or the like. Communication device 138 may enable communication between rail vehicle 102 and another rail vehicle 102, control device 104, monitoring platform 110, control station 112, network storage device 114, and/or another device. In some examples, communication device 138 may enable processor 132 to receive an operating parameter that can be used for operating rail vehicle 102 from another rail vehicle 102, control device 104, monitoring platform 110, control station 112, and/or network storage device 114. In some examples, communication device 138 may enable processor 132 to transmit an operating parameter to another rail vehicle 102 and/or transmit an operating condition of rail vehicle 102 to another rail vehicle 102, control device 104, monitoring platform 110, control station 112, and/or network storage device 114.

As further shown in FIG. 1, control device 104 includes a processor 140, a memory 142, and a communication device 144. Processor 140 is implemented in hardware, firmware, and/or a combination of hardware and software capable of being programmed to perform a function associated with rail vehicle 102 and/or wheel detection and thermal imaging system 100. Memory 142 includes a RAM, a ROM, and/or another type of dynamic or static storage device that stores information and/or instructions to be performed by processor 140. Communication device 144 includes a LAN component, a WLAN component, an RF communication component, and/or the like. Communication device 144 may enable processor 140 to receive information that can be used to control detection device 106 and/or imaging device 108 from another control device 104, control unit 130, monitoring platform 110, control station 112, and/or network storage device 114, and/or transmit information obtained from detection device 106 and/or imaging device 108 to another control device 104, control unit 130, monitoring platform 110, control station 112, and/or network storage device 114. Control device 104 may communicate with another control device 104, control unit 130, control station 112, and/or network storage device 114 directly and/or indirectly via monitoring platform 110.

In some implementations, control device 104 may be configured to communicate with detection device 106 (e.g., via wired and/or wireless connections) in order to detect a proximity of rail vehicle 102 relative to detection device 106. Detection device 106 includes an RF transmitter 146 and an RF receiver 148. In some examples, detection device 106 may be a radar device configured to transmit a narrowband RF signal (e.g., a frequency-modulated continuous wave signal) and receive a reflected portion of the narrowband RF signal to determine proximity of target objects (e.g., wheels 124 of rail vehicle 102). Detection device 106 may be positioned at a distance from rails 116 and directed at an anticipated pathway of wheels 124 (e.g., at a height above rails 116) in a manner configured to detect a passing rail vehicle 102. Additionally, or alternatively, detection device 106 may be configured to detect other types of target objects (e.g., sections of axles 128, bearings 126, wheel hubs, spindles, and/or another component of undercarriage 122 and/or frame 120 that may be exposed to a portion of the narrowband RF signal). In some examples, detection device 106 may be used to determine a wheel count, an axle count, a railcar count, and/or other information relating to rail vehicle 102.

In some implementations, RF transmitter 146 may be configured to transmit a narrowband RF signal with a wavelength or a frequency that is determined based on the distance to the target object. For example, at a distance of approximately 1.5 m from the pathway of wheels 124 of rail vehicle 102, RF transmitter 146 may be configured to transmit a narrowband RF signal having a wavelength of approximately 3 mm or a frequency of approximately 94 GHz in order to sufficiently focus the narrowband RF signal to wheels 124 at the distance. RF receiver 148 may be configured to filter received RF signals using a band pass filter that is centered at a wavelength of the narrowband RF signal transmitted by RF transmitter 146. The band pass filter may be designed to be sufficiently narrow to limit detection to RF signals being reflected from rail vehicle 102 and sufficiently wide to accommodate for variations in wavelength that can be caused by rain, snow, and/or another factor affecting signal propagation. In some examples, RF transmitter 146 and RF receiver 148 may be positioned at substantially the same distance and/or height relative to the pathway of the target objects. In some examples, RF transmitter 146 and RF receiver 148 may be positioned at different distances and/or heights relative to the pathway of the target objects.

In some implementations, control device 104 may be configured to communicate with imaging device 108 (e.g., via wired and/or wireless connections) in order to capture thermal images associated with target objects of rail vehicle 102. Imaging device 108 includes a thermal camera (e.g., a long-wave thermal imaging device, a mid-wave thermal imaging device, a short-wave thermal imaging device, and/or the like) configured to receive infrared radiation from target objects and convert the infrared radiation into thermal data. For example, imaging device 108 may be a thermal imaging device configured to capture thermal images or otherwise detect thermal data associated with wheels 124, bearings 126, axles 128, and/or other components of undercarriage 122. Imaging device 108 may be installed on a railroad (e.g., coupled to rails 116, rail bed 118, a rail tie, and/or the like) and directed to an anticipated pathway of the target objects (e.g., wheels 124, bearings 126, axles 128, and/or the like). Imaging device 108 may operate based on a command signal (e.g., provided via control device 104, detection device 106, and/or the like) that indicates appropriate times for capturing the thermal images of the target objects. In some examples, imaging device 108 may successively or contemporaneously capture multiple thermal images using different integration times to enable imaging device 108 to obtain information relating to a broader range of thermal data (e.g., corresponding to different components of undercarriage 122) within a single scene (e.g., a perspective of undercarriage 122 captured by imaging device 108 at a particular moment in time).

In some implementations, control device 104 may receive proximity data (e.g., from detection device 106) relating to undercarriage 122 of rail vehicle 102, and based on the proximity data, transmit a command signal to imaging device 108 to capture thermal images of undercarriage 122. Control device 104 may cause imaging device 108 to capture the thermal images using different integration times (e.g., durations of time that imaging device 108 is to receive infrared radiation in a particular monitoring event). Control device 104 may adjust the integration time to adjust a sensitivity of imaging device 108. For example, a longer integration time may increase sensitivity, increase thermal resolution, and add thermal detail of objects captured in a low delta temperature scene. However, if a longer integration time is used to capture a high delta temperature scene (e.g., a scene of objects that vary greatly in temperature and/or a scene containing objects with significantly higher temperatures), infrared radiation from the higher temperature objects may cause saturation that limits observability of the higher temperature objects. In such cases, a shorter integration time may be used to decrease the sensitivity, decrease the thermal resolution, and remove sufficient thermal detail from lower temperature objects to reduce such saturation effects and reveal useful information relating to higher temperature objects.

In some implementations, control device 104 may use a longer integration time using imaging device 108 (e.g., a long-wave thermal imaging device) to obtain sufficient thermal detail of in-band infrared radiation (e.g., wavelengths of approximately 8 µm to 14 µm) corresponding to a lower range of temperatures. As discussed above, control device 104 may use a shorter integration time to obtain information relating to out-of-band infrared radiation (e.g., wavelengths of approximately 3 µm to 5 µm) corresponding to a higher range of temperatures in a high temperature delta scene. In some examples, control device 104 may be used in association with another type of imaging device 108 (e.g., a short-wave thermal imaging device for in-band infrared radiation with wavelengths of approximately 1 µm to 2.5 µm, a mid-wave thermal imaging device for in-band infrared radiation with wavelengths of approximately 3 µm to 5 µm, and/or the like). In some examples, control device 104 may be used in association with yet another type of imaging device 108 (e.g., a broadband thermal imaging device for ranges of in-band infrared radiation with wavelengths of approximately 3 µm to 5 µm and 8 µm to 14 µm). In such cases, control device 104 may use imaging device 108 to capture a single thermal image using a single (e.g., fixed or variable) integration time.

In some implementations, control device 104 may use imaging device 108 to capture a first thermal image using a first integration time that provides information corresponding to a higher range of temperatures (e.g., wheel temperatures of approximately 400° C. to 500° C.) and a second thermal image using a second integration time that provides information corresponding to a lower range of temperatures (e.g., bearing temperatures of approximately 50° C. to 150° C.). As discussed above, the first integration time may be relatively shorter in duration to enable control device 104 to derive and/or infer thermal data corresponding to wheel temperatures, and the second integration time may be relatively longer in duration to enable control device 104 to derive and/or infer thermal data corresponding to bearing temperatures. In some examples, control device 104 may use a different integration time to derive and/or infer thermal data corresponding to a different range of temperatures (e.g., axle temperatures, brake temperatures, and/or the like).

In some implementations, control device 104 may receive image data relating to the first thermal image and the second thermal image, and based on the image data, determine composite thermal data associated with undercarriage 122. For example, the image data may include information relating to a first range of thermal data (e.g., a range of wheel temperatures) and a second range of thermal data (e.g., a range of bearing temperatures) detected from undercarriage 122. Control device 104 may merge, superimpose, and/or otherwise combine the first range of thermal data and the second range of thermal data within the composite thermal data. The composite thermal data may include information mapping the first range of thermal data (e.g., wheel temperatures) to a first component (e.g., wheel 124) of undercarriage 122 and mapping the second range of thermal data (e.g., bearing temperatures) to a second component (e.g., bearings 126) of undercarriage 122. In some examples, control device 104 may determine respective sets of pixel coordinates associated with the first range of thermal data and the second range of thermal data, and map the respective sets of pixel coordinates to the corresponding pixel coordinates within a composite thermal image.

In some implementations, the composite thermal data may be provided in the form of a two-dimensional image, a three-dimensional image, a three-dimensional visual model, and/or another visual representation that indexes, labels, color-codes, and/or otherwise indicates respective temperatures of one or more components in a scene of undercarriage 122. Additionally, or alternatively, the composite thermal data may be provided in the form of a heat map, a data table, an index, a record, and/or another format configured to indicate respective temperatures of one or more components in a scene of undercarriage 122. In some examples, detection device 106 and/or imaging device 108 may be integrated in control device 104. In some examples, control device 104 may be integrated into detection device 106 and/or imaging device 108. Additionally, or alternatively, control device 104 may communicate with multiple detection devices 106 and/or multiple imaging devices 108. In some examples, detection device 106 and/or imaging device 108 may communicate with multiple control devices 104.

In some implementations, detection device 106 and imaging device 108 may be positioned at a common location along a length of rails 116. In such cases, imaging device 108 may be configured to receive the proximity data from detection device 106 and capture thermal images of a detected rail vehicle 102 substantially instantaneously (e.g., within microseconds or nanoseconds of receiving the proximity data). In some examples, detection device 106 and imaging device 108 may be positioned at different locations along the length of rails 116. In such cases, imaging device 108 may be configured to receive the proximity data from detection device 106 and wait for a delay period before capturing thermal images of rail vehicle 102. The delay period may be determined based on a distance of separation between detection device 106 and imaging device 108, a travel direction of rail vehicle 102, a travel speed of rail vehicle 102, a distance between detection device 106 and rails 116, a weather condition that may affect propagation of signals transmitted and/or received by detection device 106, and/or the like.

In some implementations, control device 104 may cause an action to be performed based on the composite thermal data. For example, control device 104 may transmit the composite thermal data to another control device 104, control unit 130 of rail vehicle 102, monitoring platform 110, control station 112, and/or network storage device 114. In some examples, control device 104 may store the composite thermal data in a data structure that is accessible to another control device 104, control unit 130, monitoring platform 110, control station 112, and/or network storage device 114. In some examples, control device 104 may use the composite thermal data to determine a temperature of a component of undercarriage 122, compare the component temperature with a component temperature threshold, generate a component temperature event if the component temperature satisfies the component temperature threshold, and generate a record and/or a notification of the component temperature event. Control device 104 may transmit the record and/or the notification to another control device 104, control unit 130, monitoring platform 110, control station 112, and/or network storage device 114, and/or store the record and/or the notification in a data structure that is accessible to another control device 104, control unit 130, monitoring platform 110, control station 112, and/or network storage device 114.

As further shown in FIG. 1, monitoring platform 110 includes a processor 150, a memory 152, and a communication device 154. Processor 150 is implemented in hardware, firmware, and/or a combination of hardware and software capable of being programmed to perform a function associated with rail vehicle 102 and/or wheel detection and thermal imaging system 100. Memory 152 includes a RAM, a ROM, and/or another type of dynamic or static storage device that stores information and/or instructions to be performed by processor 150. Communication device 154 includes a LAN component, a WLAN component, an RF communication component, and/or the like. Communication device 154 may enable processor 150 to exchange information relating to an operating condition of rail vehicle 102 with control device 104, control unit 130, control station 112, and/or network storage device 114. In some examples, monitoring platform 110 may communicate directly with one or more of control unit 130, control device 104, and/or network storage device 114. Additionally, or alternatively, monitoring platform 110 may communicate with one or more of control unit 130, control device 104, and/or network storage device 114 indirectly via another device of wheel detection and thermal imaging system 100.

In some implementations, monitoring platform 110 may perform one or more functions described as being performed by control device 104. For example, monitoring platform 110 may be configured to receive proximity data (e.g., via control device 104 and/or detection device 106) relating to undercarriage 122 of rail vehicle 102, and transmit, based on the proximity data, a command signal (e.g., via control device 104 and/or imaging device 108) to capture a first thermal image and a second thermal image of undercarriage 122 using different integration times. In some examples, monitoring platform 110 may receive image data (e.g., via control device 104 and/or imaging device 108) relating to a first range of thermal data associated with the first thermal image and a second range of thermal data associated with the second thermal image. In some examples, monitoring platform 110 may determine, based on the image data, composite thermal data mapping the first range of thermal data to a first component of undercarriage 122 (e.g., wheels 124) and mapping the second range of thermal data to a second component of undercarriage 122 (e.g., bearings 126).

In some implementations, monitoring platform 110 may be configured to cause an action to be performed based on the composite thermal data. For example, monitoring platform 110 may transmit the composite thermal data to control unit 130 of rail vehicle 102, control station 112, and/or network storage device 114. In some examples, monitoring platform 110 may store the composite thermal data in a data structure that is accessible to control unit 130, control station 112, and/or network storage device 114. Additionally, or alternatively, monitoring platform 110 may use the composite thermal data to determine a temperature of a component of undercarriage 122, compare the component temperature with a component temperature threshold, generate a component temperature event if the component temperature satisfies the component temperature threshold, and generate a record and/or a notification of the component temperature event. Monitoring platform 110 may transmit the record and/or the notification to control unit 130, control station 112, and/or network storage device 114, and/or store the record and/or the notification in a data structure that is accessible to control unit 130, control station 112, and/or network storage device 114.

As further shown in FIG. 1, control station 112 includes a processor 156, a memory 158, a user interface 160, and a communication device 162. Processor 156 is implemented in hardware, firmware, and/or a combination of hardware and software capable of being programmed to perform a function associated with rail vehicle 102 and/or wheel detection and thermal imaging system 100. Memory 158 includes a RAM, a ROM, and/or another type of dynamic or static storage device that stores information and/or instructions to be performed by processor 156. User interface 160 includes an input device enabling a remote operator to specify an operating parameter of rail vehicle 102, and an output device enabling the remote operator to access an operating condition of rail vehicle 102. Communication device 162 includes a LAN component, a WLAN component, an RF communication component, and/or the like. Communication device 162 may enable processor 156 to exchange information relating to an operating condition of rail vehicle 102 with control device 104, control unit 130, monitoring platform 110, and/or network storage device 114. Control station 112 may communicate with control unit 130, control device 104, and/or network storage device 114 directly and/or indirectly via monitoring platform 110. In some examples, control station 112 may serve as a user interface of monitoring platform 110.

In some implementations, control station 112 may perform one or more functions described as being performed by control device 104 and/or monitoring platform 110. For example, control station 112 may be configured to receive proximity data (e.g., via control device 104, detection device 106, and/or monitoring platform 110) relating to undercarriage 122 of rail vehicle 102, and transmit, based on the proximity data, a command signal (e.g., via control device 104, imaging device 108, and/or monitoring platform 110) to capture a first thermal image and a second thermal image of undercarriage 122 using different integration times. In some examples, control station 112 may receive image data (e.g., via control device 104, imaging device 108, and/or monitoring platform 110) relating to a first range of thermal data associated with the first thermal image and a second range of thermal data associated with the second thermal image. In some examples, control station 112 may determine, based on the image data, composite thermal data mapping the first range of thermal data to a first component of undercarriage 122 (e.g., wheels 124) and mapping the second range of thermal data to a second component of undercarriage 122 (e.g., bearings 126).

In some implementations, control station 112 may be configured to cause an action to be performed based on the composite thermal data. For example, control station 112 may transmit the composite thermal data to control unit 130 of rail vehicle 102, monitoring platform 110, and/or network storage device 114. In some examples, control station 112 may store the composite thermal data in a data structure that is accessible to control unit 130, monitoring platform 110, and/or network storage device 114. Additionally, or alternatively, control station 112 may use the composite thermal data to determine a temperature of a component of undercarriage 122, compare the component temperature with a component temperature threshold, generate a component temperature event if the component temperature satisfies the component temperature threshold, and generate a record and/or a notification of the component temperature event. Control station 112 may transmit the record and/or the notification to control unit 130, monitoring platform 110, and/or network storage device 114, and/or store the record and/or the notification in a data structure that is accessible to control unit 130, monitoring platform 110, and/or network storage device 114.

As further shown in FIG. 1, network storage device 114 includes one or more devices capable of storing, processing, and/or routing information. Network storage device 114 may include, for example, a server device, a device that stores a data structure, a device in a cloud computing environment or a data center, and/or the like. In some examples, network storage device 114 may include a communication interface that allows network storage device 114 to receive information from and/or transmit information to control device 104, control unit 130 of rail vehicle 102, monitoring platform 110, control station 112, and/or another device associated with wheel detection and thermal imaging system 100. In some examples, network storage device 114 may store location data associated with rail vehicle 102, coordinate data associated with a railroad, coordinate data associated with a target destination, and/or the like. In some examples, network storage device 114 may maintain other information relating to an operating condition associated with rail vehicle 102, a thermal image associated with rail vehicle 102, composite thermal data associated with rail vehicle 102, a component temperature event associated with rail vehicle 102, an event record associated with rail vehicle 102, an event notification associated with rail vehicle 102, and/or the like.

As indicated above, FIG. 1 is provided as an example. Other examples may differ from what is described in connection with FIG. 1.

FIGS. 2A and 2B are diagrams of an example implementation 200 of wheel detection and thermal imaging system 100 described herein. As shown in FIG. 2A, and by reference number 202, control device 104 may monitor for a passing rail vehicle 102 using RF transmitter 146 of detection device 106. For example, RF transmitter 146 may transmit a narrowband RF signal 204 (e.g., a frequency-modulated continuous wave signal) at a distance from rails 116 and directed at an anticipated pathway of wheels 124 (e.g., at a height above rails 116) in a manner configured to detect when rail vehicle 102 passes detection device 106. In some examples, RF transmitter 146 may be configured to transmit a narrowband RF signal with a wavelength or a frequency that is determined based on the distance to the target object. For example, at a distance of approximately 1.5 m from the pathway of wheels 124 of rail vehicle 102, RF transmitter 146 may be configured to transmit a narrowband RF signal having a wavelength of approximately 3 mm or a frequency of approximately 94 GHz in order to sufficiently focus the narrowband RF signal onto wheels 124 at the distance.

As shown in FIG. 2B, and by reference number 206, control device 104 may detect when rail vehicle 102 is in proximity (e.g., passes detection device 106) using RF receiver 148 of detection device 106. For example, RF receiver 148 may receive a portion of the narrowband RF signal 204 that was transmitted by RF transmitter 146 and reflected via wheel 124 of the passing rail vehicle 102. Detection device 106 and/or control device 104 may be configured to filter received RF signals using a band pass filter that is centered at a wavelength of the narrowband RF signal 204 (e.g., approximately 3 mm) transmitted by RF transmitter 146. The band pass filter may be designed to be sufficiently narrow to limit detection to RF signals being reflected from rail vehicle 102 and sufficiently wide to accommodate for variations in wavelength that can be caused by rain, snow, and/or another factor affecting signal propagation. As shown, detection device 106 may generate proximity data in the form of a waveform 208 corresponding to a magnitude of the reflected portion of the narrowband RF signal 204 as a function of time. In some examples, detection device 106 may compare the magnitude of waveform 208 to a signal threshold 210, and generate the proximity data based on determining that the signal threshold 210 is satisfied.

In some implementations, control device 104 may receive the proximity data (e.g., from detection device 106) in the form of waveform 208, and post-process waveform 208 to identify proximity of rail vehicle 102 based on waveform 208 (e.g., based on a comparison to signal threshold 210). In some examples, detection device 106 may pre-process waveform 208 to verify that the detected object corresponds to rail vehicle 102, and provide the proximity data to control device 104 in the form of an event, a value, and/or another indication confirming detection of rail vehicle 102. In some examples, control device 104 may receive the proximity data as a wheel count (e.g., a number of times waveform 208 satisfies signal threshold 210 within a particular period of time). In some examples, control device 104 and/or detection device 106 may compare a wheel count with a count threshold to verify whether the wheel count corresponds to a target rail vehicle 102. Additionally, or alternatively, control device 104 and/or detection device 106 may be configured to detect other types of target objects (e.g., sections of axles 128, bearings 126, wheel hubs, spindles, and/or another component of undercarriage 122 and/or frame 120 that may be exposed to a portion of the narrowband RF signal 204). In some examples, control device 104 may determine an axle count, a railcar count, and/or other information relating to rail vehicle 102.

As indicated above, FIGS. 2A and 2B are provided as an example. Other examples may differ from what is described in connection with FIGS. 2A and 2B.

Figure 3A:
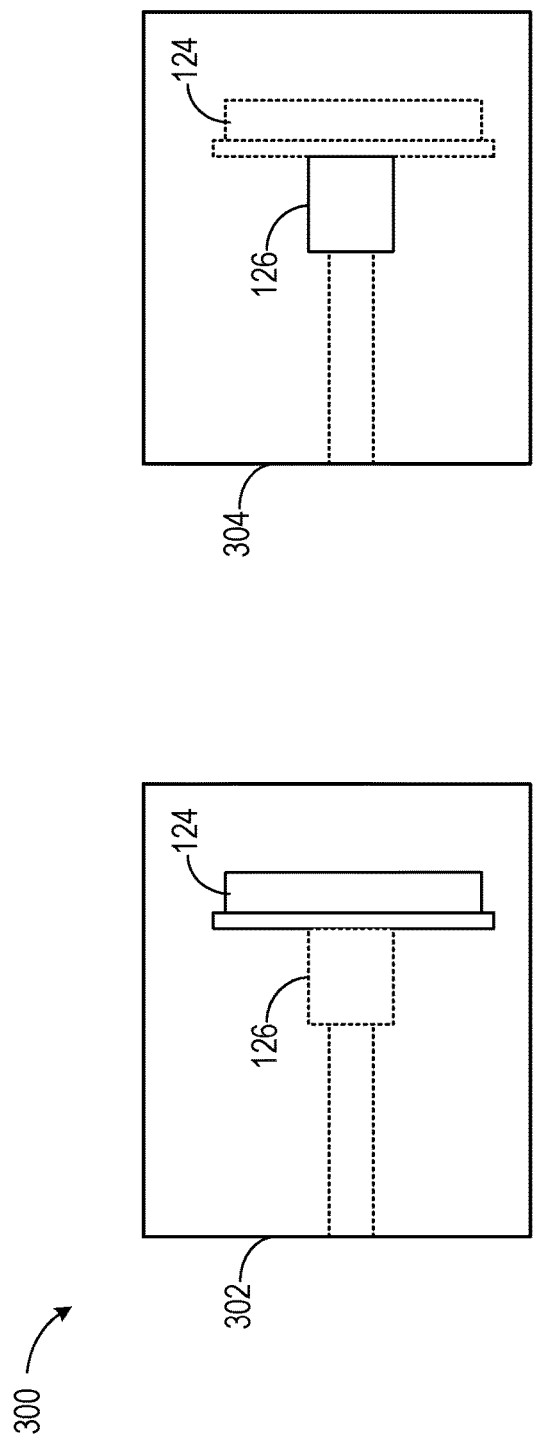
FIGS. 3A-3C are diagrams of an example implementation of a wheel detection and thermal imaging system described herein.
Figure 3B:
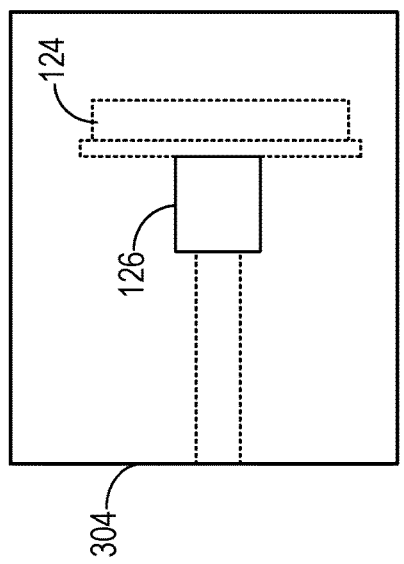
Figure 3C:
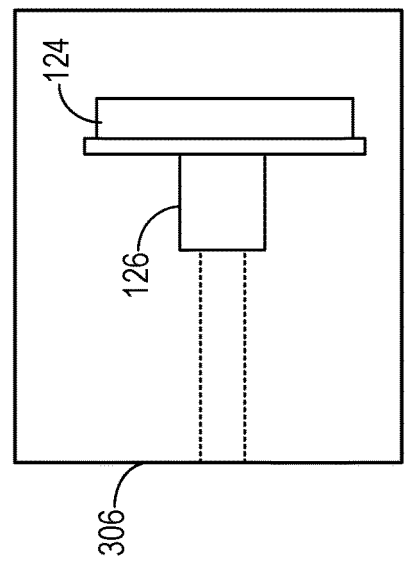

FIGS. 3A-3C are diagrams of an example implementation 300 of wheel detection and thermal imaging system 100 described herein. As shown in FIG. 3A, and by reference number 302, control device 104 may capture a first thermal image of wheel 124 of a detected rail vehicle 102 based on determining that rail vehicle 102 is present (e.g., based on the proximity data provided by detection device 106). For example, the first thermal image may be captured using a first integration time that is shorter in duration and configured to obtain information relating to a typical range of wheel temperatures (e.g., approximately 400° C. to 500° C.). As indicated by solid lines, the first thermal image may include sufficient thermal data associated with wheel 124 of undercarriage 122. As indicated by phantom lines, the first thermal image may be unable to provide sufficient thermal data associated with bearings 126 and/or other components of undercarriage 122 that typically operate at temperatures outside of the range of wheel temperatures.

As shown in FIG. 3B, and by reference number 304, control device 104 may capture a second thermal image of bearings 126 of a detected rail vehicle 102 based on determining that rail vehicle 102 is present (e.g., based on the proximity data provided by detection device 106). The control device 104 may capture the second thermal image successively or contemporaneously with the first thermal image so as to capture a scene of undercarriage 122 that is consistent with a scene captured via the first thermal image. The control device 104 may capture the second thermal image using a second integration time that is longer in duration than the first integration time used to capture the first thermal image. For example, the second integration time may be configured to obtain information relating to a typical range of bearing temperatures (e.g., approximately 50° C. to 150° C.). As indicated by solid lines, the second thermal image may include sufficient thermal data associated with bearings 126 of undercarriage 122. As indicated by phantom lines, the second thermal image may be unable to provide sufficient thermal data associated with wheel 124 and/or other components of undercarriage 122 that typically operate in other temperature ranges.

As shown in FIG. 3C, and by reference number 306, control device 104 may determine composite thermal data associated with rail vehicle 102 based on the first thermal image and the second thermal image. For example, control device 104 may merge, superimpose, and/or otherwise combine a first range of thermal data associated with the first thermal image (e.g., corresponding to wheel temperatures) and a second range of thermal data associated with the second thermal image (e.g., corresponding to bearing temperatures) to determine the composite thermal data. As shown for the example in FIG. 3C, the composite thermal data may be provided in the form of a composite thermal image. For example, the composite thermal image may include sufficient thermal data associated with wheel 124 and bearings 126 of undercarriage 122 (e.g., as indicated by solid lines), but may be unable to provide sufficient thermal data associated with other components of undercarriage 122 (e.g., as indicated by phantom lines) that typically operate in other temperature ranges. In some examples, control device 104 may similarly capture another thermal image using another integration time to incorporate other thermal data (e.g., axle temperatures, brake temperatures, and/or the like) into the composite thermal image.

In some implementations, control device 104 may determine respective sets of pixel coordinates associated with the first range of thermal data and the second range of thermal data, and map the respective sets of pixel coordinates to the corresponding pixel coordinates within the composite thermal image. For example, control device 104 may determine a set of pixel coordinates corresponding to wheel 124 based on the first thermal image, and determine a set of pixel coordinates corresponding to bearings 126 based on the second thermal image. Control device 104 may position thermal data associated with wheel temperatures and bearing temperatures at the corresponding pixel coordinates within the composite thermal image. In some examples, the composite thermal image may be provided as a two-dimensional image, a three-dimensional image, a three-dimensional visual model, and/or another visual representation that indexes, labels, color-codes, and/or otherwise indicates respective temperatures of one or more components in a scene of undercarriage 122. In some examples, the composite thermal data may be provided as a heat map, a data table, an index, a record, and/or another format suited to indicate respective temperatures of one or more components in a scene of undercarriage 122.

In some implementations, control device 104 may cause an action to be performed based on the composite thermal data. For example, control device 104 may transmit the composite thermal data to another control device 104, control unit 130 of rail vehicle 102, monitoring platform 110, control station 112, and/or network storage device 114. In some examples, control device 104 may store the composite thermal data in a data structure that is accessible to another control device 104, control unit 130, monitoring platform 110, control station 112, and/or network storage device 114. In some examples, control device 104 may use the composite thermal data to determine a temperature of a component of undercarriage 122, compare the component temperature with a component temperature threshold, generate a component temperature event if the component temperature satisfies the component temperature threshold, and generate a record and/or a notification of the component temperature event. Control device 104 may transmit the record and/or the notification to another control device 104, control unit 130, monitoring platform 110, control station 112, and/or network storage device 114, and/or store the record and/or the notification in a data structure that is accessible to another control device 104, control unit 130, monitoring platform 110, control station 112, and/or network storage device 114.

As indicated above, FIGS. 3A-3C are provided as an example. Other examples may differ from what is described in connection with FIGS. 3A-3C.

Figure 4:
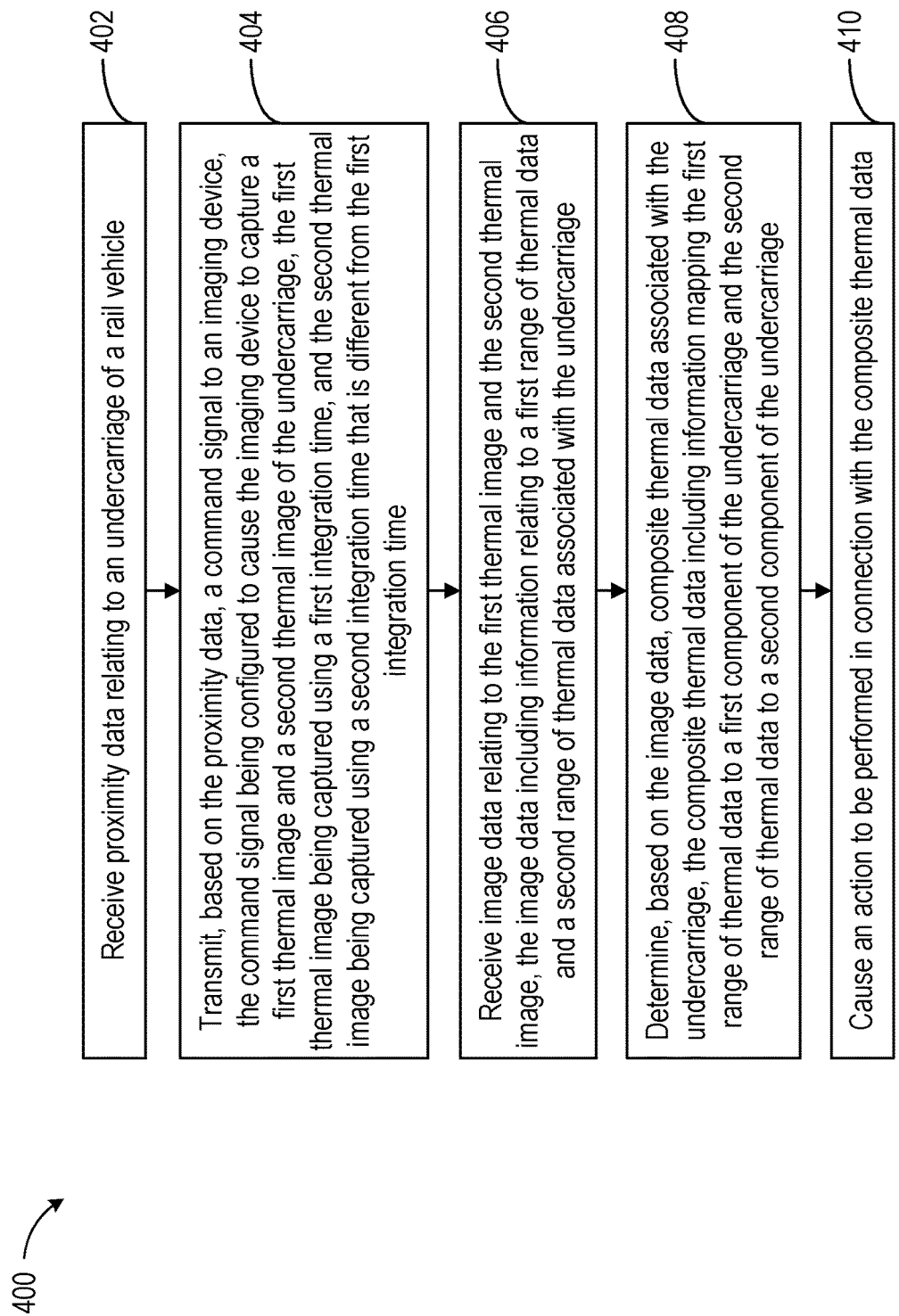
FIG. 4 is a flow chart of an example process for operating a wheel detection and thermal imaging system.

FIG. 4 is a flow chart of an example process 400 for operating a wheel detection and thermal imaging system. One or more process blocks of FIG. 4 may be performed by a control device (e.g., control device 104 of wheel detection and thermal imaging system 100) and/or by another component or a group of components separate from or including the control device (e.g., detection device 106, imaging device 108, control unit 130 of rail vehicle 102, monitoring platform 110, control station 112, network storage device 114, and/or the like).

As shown in FIG. 4, process 400 may include receiving proximity data relating to an undercarriage of a rail vehicle (block 402). For example, the control device (e.g., using processor 140, memory 142, communication device 144, and/or the like) may receive proximity data relating to an undercarriage of a rail vehicle, as described above.

As further shown in FIG. 4, process 400 may include transmitting, based on the proximity data, a command signal to an imaging device, the command signal being configured to cause the imaging device to capture a first thermal image and a second thermal image of the undercarriage, the first thermal image being captured using a first integration time, and the second thermal image being captured using a second integration time that is different from the first integration time (block 404). For example, the control device (e.g., using processor 140, memory 142, communication device 144, and/or the like) may transmit, based on the proximity data, a command signal to an imaging device, as described above. In some examples, the command signal may be configured to cause the imaging device to capture a first thermal image and a second thermal image of the undercarriage. The first thermal image may be captured using a first integration time, and the second thermal image may be captured using a second integration time that is different from the first integration time.

As further shown in FIG. 4, process 400 may include receiving image data relating to the first thermal image and the second thermal image, the image data including information relating to a first range of thermal data and a second range of thermal data associated with the undercarriage (block 406). For example, the control device (e.g., using processor 140, memory 142, communication device 144, and/or the like) may receive image data relating to the first thermal image and the second thermal image, as described above. In some examples, the image data may include information relating to a first range of thermal data and a second range of thermal data associated with the undercarriage.

As further shown in FIG. 4, process 400 may include determining, based on the image data, composite thermal data associated with the undercarriage, the composite thermal data including information mapping the first range of thermal data to a first component of the undercarriage and mapping the second range of thermal data to a second component of the undercarriage (block 408). For example, the control device (e.g., using processor 140, memory 142, communication device 144, and/or the like) may determine, based on the image data, composite thermal data associated with the undercarriage, as described above. In some examples, the composite thermal data may include information mapping the first range of thermal data to a first component of the undercarriage and mapping the second range of thermal data to a second component of the undercarriage.

As further shown in FIG. 4, process 400 may include causing an action to be performed in connection with the composite thermal data (block 410). For example, the control device (e.g., using processor 140, memory 142, communication device 144, and/or the like) may cause an action to be performed in connection with the composite thermal data, as described above.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

A railroad may be provided with a monitoring system to ensure safe and efficient operation of rail vehicles on the railroad. A monitoring system may include an arrangement of sensors that are installed on and/or attached to a rail bed, a rail, a rail tie, and/or another structure of the railroad and configured to assess a condition of an undercarriage component (e.g., a wheel, a bearing, an axle, a braking mechanism, and/or the like) of a passing rail vehicle. Although monitoring systems may be helpful in identifying early signs of wear or damage to undercarriage components of a rail vehicle and used to prevent safety hazards, such monitoring systems may require a significant number of hardware components (e.g., sensors, detectors, cameras, controllers, cables, and/or other equipment) to be installed directly on the railroad. Due to the close proximity to moving rail vehicles, such on-track hardware may be more susceptible to wear and require special procedures to be maintained in working condition. Accordingly, it is generally desirable to minimize the number of on-track hardware components needed on the railroad.

A wheel detection and thermal imaging system described herein enables precise and effective monitoring of undercarriage components of a rail vehicle using fewer on-track hardware components. In particular, the wheel detection and thermal imaging system provides an off-track detection device and a single imaging device that can serve the purpose of multiple thermal imaging cameras. For example, the detection device is configured to use a focused narrowband RF signal (e.g., a frequency-modulated continuous wave signal) that enables accurate detection of a passing rail vehicle at a distance from a railroad. The imaging device is configured to capture multiple thermal images using different integration times to obtain thermal data corresponding to a broader range of temperatures within a single instance or scene. For example, the imaging device can be used to provide a single composite thermal image including both high temperature ranges (e.g., associated with wheel temperatures) and low temperature ranges (e.g., associated with bearing temperatures).

Accordingly, the wheel detection and thermal imaging system overcomes one or more problems associated with currently available railroad monitoring solutions. For instance, by providing a detection device that can detect proximity of a rail vehicle at a distance from a railroad, the wheel detection and thermal imaging system overcomes a need for on-track inductance sensors and/or the like. By enabling a single thermal camera to capture a broader range of temperatures, the wheel detection and thermal imaging system may reduce the number of on-track thermal imaging cameras that may otherwise be needed to monitor temperature. The wheel detection and thermal imaging system may also conserve computational and/or networking resources that may otherwise be needed to process multiple thermal images from multiple thermal imaging cameras per monitoring event. The wheel detection and thermal imaging system may thereby help to reduce costs and downtime associated with installing, maintaining, and/or configuring on-track hardware. In addition, removing unnecessary on-track hardware may help facilitate railroad work (e.g., repairs, installations, maintenance, and/or the like), and reduce costs and downtime associated with such railroad work.

What is claimed is:

1. A method, comprising:
    receiving, by a device, proximity data relating to an undercarriage of a rail vehicle;
    transmitting, by the device and based on the proximity data, a command signal to an imaging device,
        the command signal being configured to cause the imaging device to capture a first thermal image and a second thermal image of the undercarriage,
        the first thermal image being captured using a first integration time, and
        the second thermal image being captured using a second integration time that is different from the first integration time;
    receiving, by the device, image data relating to the first thermal image and the second thermal image,
        the image data including information relating to a first range of thermal data and a second range of thermal data associated with the undercarriage;
    determining, by the device and based on the image data, composite thermal data associated with the undercarriage,
        the composite thermal data including information mapping the first range of thermal data to a wheel of the undercarriage and mapping the second range of thermal data to bearings of the undercarriage,
        the first range of thermal data corresponding to a range of wheel temperatures of the wheel of the undercarriage, and
        the second range of thermal data corresponding to a range of bearing temperatures of the bearings of the undercarriage; and
    causing, by the device, an action to be performed in connection with the composite thermal data.

2. The method of claim 1, wherein the proximity data is received from a detection device,
    the detection device including a radar device configured to:
        transmit a narrowband radio frequency signal that is directed at a pathway of the undercarriage,
        receive a reflected portion of the narrowband radio frequency signal, and
        generate, based on the reflected portion of the narrowband radio frequency signal, the proximity data.

3. The method of claim 1, wherein the command signal is configured to cause the imaging device to contemporaneously capture the first thermal image and the second thermal image.

4. The method of claim 1, wherein the first integration time is shorter in duration than the second integration time,
    the first integration time being configured to obtain information relating to the range of wheel temperatures, and the second integration time being configured to obtain information relating to the range of bearing temperatures.

5. The method of claim 1, wherein causing the action to be performed comprises:
generating, based on the composite thermal data, a composite thermal image of the undercarriage,
the composite thermal image including visual representations of the wheel and the bearings of the undercarriage, and
the visual representations including information relating to a wheel temperature of the wheel and a bearing temperature of the bearings.

6. The method of claim 1, wherein causing the action to be performed comprises:
determining, based on the composite thermal data, a component temperature of a component of the undercarriage;
comparing the component temperature with a component temperature threshold;
generating a component temperature event based on determining that the component temperature satisfies the component temperature threshold; and
generating one or more of a record or a notification of the component temperature event.

7. A device, comprising:
one or more memories; and
one or more processors, communicatively coupled to the one or more memories, configured to:
transmit a narrowband radio frequency signal that is directed at a pathway of an undercarriage of a rail vehicle;
receive a reflected portion of the narrowband radio frequency signal;
compare a magnitude of the reflected portion of the narrowband radio frequency signal with a signal threshold;
generate proximity data relating to the undercarriage based on determining that the magnitude of the reflected portion of the narrowband radio frequency signal satisfies the signal threshold; and
cause an action to be performed based on the proximity data,
the action causing composite thermal data to be determined,
the composite thermal data including information mapping a first range of thermal data to a wheel of the undercarriage and mapping a second range of thermal data to bearings of the undercarriage,
the first range of thermal data corresponding to a range of temperatures of the wheel of the undercarriage, and
the second range of thermal data corresponding to a range of temperatures of the bearings of the undercarriage.

8. The device of claim 7, wherein the narrowband radio frequency signal is transmitted using a radio frequency transmitter of a radar device and the reflected portion of the narrowband radio frequency signal is received using a radio frequency receiver of the radar device,
the radar device being disposed between 1.0 m and 2.0 m from the pathway of the undercarriage, and
the narrowband radio frequency signal having a wavelength between 2 mm and 4 mm.

9. The device of claim 7, wherein the narrowband radio frequency signal is a frequency-modulated continuous wave signal.

10. The device of claim 7, wherein the narrowband radio frequency signal is directed at a pathway of a wheel of the undercarriage and configured to detect proximity of the wheel.

11. The device of claim 7, wherein the reflected portion of the narrowband radio frequency signal is filtered using a band pass filter that is centered at a wavelength of the narrowband radio frequency signal being transmitted.

12. The device of claim 7, wherein the one or more processors are configured to, when causing the action to be performed:
capture a first thermal image and a second thermal image of the undercarriage,
the first thermal image being captured using a first integration time, and
the second thermal image being captured using a second integration time that is different from the first integration time;
receive image data relating to the first thermal image and the second thermal image,
the image data including information relating to the first range of thermal data and the second range of thermal data associated with the undercarriage; and
determine, based on the image data, the composite thermal data,
the composite thermal data including information mapping the first range of thermal data and mapping the second range of thermal data to one or more components of the undercarriage.

13. The device of claim 7, wherein the one or more processors are configured to, when causing the action to be performed:
transmit a command signal to a thermal imaging device,
the command signal being configured to cause the thermal imaging device to capture a first thermal image and a second thermal image of the undercarriage,
the first thermal image being captured using a first integration time and corresponding to the first range of thermal data, and
the second thermal image being captured using a second integration time and corresponding to the second range of thermal data.

14. The device of claim 7, wherein the one or more processors are configured to, when causing the action to be performed:
generate, based on the composite thermal data, a composite thermal image of the undercarriage,
the composite thermal image including visual representations of the wheel and the bearings of the undercarriage, and
the visual representations including information relating to a temperature of the wheel and a temperature of the bearings.

15. A system, comprising:
a detection device configured to generate proximity data relating to a proximity of an undercarriage of a rail vehicle;
an imaging device configured to capture one or more thermal images of the undercarriage; and
a control device in communication with the detection device and the imaging device, the control device being configured to:
receive, based on the proximity data, a first thermal image and a second thermal image of the undercarriage, the first thermal image being captured using a first integration time, and the second thermal image being captured using a second integration time that is different from the first integration time, determine, based on the first thermal image and the second thermal image, composite thermal data associated with the undercarriage, the composite thermal data including information mapping a first range of thermal data to a wheel of the undercarriage and mapping a second range of thermal data to bearings of the undercarriage, the first range of thermal data corresponding to a range of wheel temperatures of the wheel of the undercarriage, and the second range of thermal data corresponding to a range of bearing temperatures of the bearings of the undercarriage, and cause an action to be performed in connection with the composite thermal data.

16. The system of claim 15, wherein the detection device is disposed at a distance from a railroad of the rail vehicle and includes a radar device configured to:

transmit a narrowband radio frequency signal that is directed at a pathway of the undercarriage, receive a reflected portion of the narrowband radio frequency signal, and generate, based on the reflected portion of the narrowband radio frequency signal, the proximity data.

17. The system of claim 15, wherein the imaging device is disposed in proximity to a railroad of the rail vehicle and includes a thermal imaging device configured to:

receive infrared radiation from the undercarriage, and convert the infrared radiation into a thermal image of the undercarriage.

18. The system of claim 15, wherein the control device is configured to contemporaneously receive the first thermal image and the second thermal image.

19. The system of claim 15, wherein the first integration time is shorter in duration than the second integration time, the first integration time being configured to obtain information relating to the range of wheel temperatures, and the second integration time being configured to obtain information relating to the range of bearing temperatures.

20. The system of claim 15, wherein the control device, to cause the action to be performed, is configured to generate, based on the composite thermal data, a composite thermal image of the undercarriage, the composite thermal image including visual representations of the wheel and the bearings of the undercarriage, and the visual representations including information relating to a temperature of the wheel and a temperature of the bearings.

* * * * *